(12) United States Patent
Rodgers et al.

(10) Patent No.: US 11,739,230 B2
(45) Date of Patent: *Aug. 29, 2023

(54) PRECIPITATION OF POLYETHER BLOCK AMIDE AND THERMOPLASTIC POLYETHYLENE TO ENHANCE OPERATIONAL WINDOW FOR THREE DIMENSIONAL PRINTING

(71) Applicant: JABIL INC., St. Petersburg, FL (US)

(72) Inventors: Luke Rodgers, St. Petersburg, FL (US); Erik Gjovik, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/333,096

(22) Filed: May 28, 2021

(65) Prior Publication Data

US 2021/0284854 A1 Sep. 16, 2021

Related U.S. Application Data

(63) Continuation of application No. 16/342,433, filed as application No. PCT/US2017/056996 on Oct. 17, 2017, now Pat. No. 11,046,857.

(60) Provisional application No. 62/409,036, filed on Oct. 17, 2016.

(51) Int. Cl.
| | |
|---|---|
| *C09D 11/102* | (2014.01) |
| *C08J 3/14* | (2006.01) |
| *C09D 11/108* | (2014.01) |
| *C08L 101/00* | (2006.01) |
| *C08K 7/22* | (2006.01) |
| *C08G 69/40* | (2006.01) |
| *C08K 9/04* | (2006.01) |
| *B33Y 70/00* | (2020.01) |

(52) U.S. Cl.
CPC ............ *C09D 11/102* (2013.01); *B33Y 70/00* (2014.12); *C08G 69/40* (2013.01); *C08J 3/14* (2013.01); *C08K 7/22* (2013.01); *C08K 9/04* (2013.01); *C08L 101/00* (2013.01); *C09D 11/108* (2013.01); *C08J 2323/00* (2013.01); *C08J 2375/04* (2013.01); *C08J 2377/00* (2013.01); *C08J 2387/00* (2013.01)

(58) Field of Classification Search
CPC . B33Y 70/00–10; C08J 3/14; C08K 75/04–16
See application file for complete search history.

(56) References Cited

U.S. PATENT DOCUMENTS

| | | | |
|---|---|---|---|
| 11,046,857 B2 * | 6/2021 | Rodgers | ................. C08G 69/40 |
| 2016/0312037 A1 * | 10/2016 | Zhao | ..................... B33Y 10/00 |

* cited by examiner

Primary Examiner — Ana L. Woodward
(74) Attorney, Agent, or Firm — Thomas J. McWilliams; Barnes & Thornburg LLP (57) ABSTRACT

A polymer material suitable for three-dimensional printing that may include at least one of polyether block amide, thermoplastic polyurethane, and thermoplastic olefin. The polymer is formed through chemical precipitation forming a precipitated pulverulent polymer which possesses increased operating window characteristics selected from the group consisting at least one of a wider than typical range between and among the melting and recrystallization temperatures, a larger enthalpy upon melting, and a low volumetric change during recrystallization.

4 Claims, 4 Drawing Sheets

PRECIPITATION OF POLYETHER BLOCK AMIDE AND THERMOPLASTIC POLYETHYLENE TO ENHANCE OPERATIONAL WINDOW FOR THREE DIMENSIONAL PRINTING

CROSS-REFERENCE TO RELATED APPLICATIONS

The present application is a Continuation Application of U.S. application Ser. No. 16/342,433, filed Apr. 16, 2019; entitled: "PRECIPITATION OF POLYETHER BLOCK AMIDE AND THERMOPLASTIC POLYETHYLENE TO ENHANCE OPERATIONAL WINDOW FOR THREE DIMENSIONAL PRINTING," which claims the benefit of priority to PCT Application No. PCT/US2017/056996, filed Oct. 17, 2017, entitled "PRECIPITATION OF POLYETHER BLOCK AMIDE AND THERMOPLASTIC POLYETHYLENE TO ENHANCE OPERATIONAL WINDOW FOR THREE DIMENSIONAL PRINTING," which claims priority to Provisional Application No. 62/409,036, filed Oct. 17, 2016, entitled "PRECIPITATION OF POLYETHER BLOCK AMIDE AND THERMOPLASTIC POLYETHYLENE TO ENHANCE OPERATIONAL WINDOW FOR THREE DIMENSIONAL PRINTING," which are herein incorporated by reference in their entirety.

BACKGROUND

Field of the Disclosure

The present disclosure relates to materials and methods of making same for additive manufacturing, and, more particularly, to precipitated pulverulent Polyether block amide (PEBA), thermoplastic olefin (TPO), and thermoplastic polyurethane (TPU) having increased operating windows for additive manufacturing applications.

Description of the Background

Additive manufacturing, commonly known as three-dimensional printing (3D-printing), constitutes a significant advance in the development of not only printing technologies, but also of product development, prototyping, and experimental capabilities. Capabilities of 3D-printing include forming physical objects of virtually any geometry. By way of non-limiting example, gears, sprockets, toys, models, prototypes, and countless other physical objects can now be built using a 3D printer.

Typically, an object to be built is first created as a 3D digitally-modeled image. Using common computer-aided design (CAD) software, the modeled image is virtually created. After that, the object model is virtually "sliced" into thin layers, which ultimately comprise instructions of how the model will be physically built by the 3D printer. This virtual "slicing" is needed because conventional methods of 3D-printing involve a print head that successively deposits material in thin layers according to the geometry of the modeled image based on the printing instructions for each layer. The physical object is then produced by depositing successive layers of material one on top of another, according to the layer-instructions, from bottom to top. The print head is capable of depositing the heated material while moving in multiple linear directions, while the base moves in three-dimensions. The print head continues depositing the material until the top, or last, layer of the object is reached and the object is thus fully formed.

Numerous methods of powder based 3D-printing have been developed. Selective laser sintering (SLS) is a 3D-printing technique that uses a laser to fuse powder material on successive layers based on the geometry of the 3D model. High speed sintering (HSS) and Multi jet fusion (MJF) 3D-printing employ multiple jets that similarly deposit successive layers of IR absorbing ink onto powder material, followed by exposure to IR energy for selective melting of the powder layer. Electrophotography 3D-printing employs a rotating photoconductor that builds the object layer-by-layer from the base.

SLS, MJF, and HSS 3D-printing share the same type of free floating, non-fixed, powder bed used for the production of the object. They share the same material requirements for compatibility with the printing process since the free body diagram of the additively built object will have the same stresses applied, only with different heating mechanisms to obtain the melt phase. The free body diagram of a 3D printed object can be used to determine the residual stresses expected in the object. This is necessary for successfully building the object. If the residual stress is too high, the object will deform into the printing region and be displaced in the part bed by the printing processes such as the powder deposition blade or roller.

The prior art identifies many ways to address residual stresses. In general, to obtain the lowest amount of residual stress in a free floating powder bed, both the modulus and the volumetric change of the molten phase should be suitably low. This is so the selectively molten areas do not induce large enough residual stresses into the object that it leaves a build plane. The most common process for addressing residual stresses for these powder bed-based 3D printers, is to use a polymer with a sufficiently large operating window between its melting temperature and its recrystallization temperature. Therefore, keeping the molten region a low modulus and uncrystallized minimizes large strain until the entire object is built. Unfortunately, few polymers have a broad enough window between the two aforementioned phase transitionals to allow the SLS and MJF processes to build the object with a low enough residual stress.

Thus, when choosing 3D-printing materials the breadth of the operating window is a significant process parameter. Physical characteristics of a suitable polymer include a melting temperature that is higher than its recrystallization temperature, and a suitability for effective localized melting.

Specifically, the operating window should be such that the selectively melted polymer exhibits a modulus that is low enough to not create problematic residual stresses in the printed object while cooling to the part bed temperature. And at the part bed temperature, no formation of crystallites is observed. Specifically, the window should be such that the polymer effectively melts at a low enough modulus that it does not induce residual stress on the printed object during cooling. If achieved, there is no substantive volumetric change through the recrystallization temperature in the object, until the entire object is built. If the operating window of the polymer is too small, a build-up of stresses occurs, in part, because the polymer shrinks during the build.

It is, therefore, the gap size between the melting point and the recrystallization temperature of the polymer that forms a suitable operational window to better allow for polymer printing in SLS, HSS, and MJF 3D-printing systems. To expand the range of available usable materials in these printing systems, the physical properties of the polymers, and processes that may change their physical properties and expand the operating windows, must be considered.

Other polymers, such as thermoplastic elastomers (TPE) may exhibit a low enough modulus, that operating outside of the typical operating window does not result in the failure of a part build, but rather higher than desired porosity. That said, having a higher melting point, larger and or more crystallites, and a lower recrystallization temperature are still desired. This is because a higher melting point will enable a higher part bed temperature, create larger and/or more crystallites that prevent unwanted part growth in the part bed (defined as when the powder near the selectively melted polymer also melts), and lower the recrystallization temperature.

SUMMARY

The disclosed exemplary apparatuses, systems, and methods provide powder polyether block amides, thermoplastic polyurethanes, and/or thermoplastic olefins formed through chemical precipitation to create an increased operating window for use in SLS, MJF, HSS, and electrophotography 3D-printing applications. An embodiment of the disclosure may provide a precipitated pulverulent polymer formed through precipitating the polymer in a solvent, allowing the polymer to form crystallites, and then employing the precipitated pulverulent polymer in a powder-based 3D-printing process.

A polymer material suitable for three-dimensional printing may include at least one polymer selected from the group consisting of polyether block amides, thermoplastic polyurethanes, and thermoplastic olefins. The at least one polymer is formed through chemical precipitation to a precipitated pulverulent polymer which possesses increased operating window characteristics. Said characteristics are selected from the group consisting at least one of a wider than typical range between and among the melting and recrystallization temperatures, a larger enthalpy upon melting, and a low volumetric change during recrystallization.

In the above and other illustrative embodiments, the polymer material may further comprise: having a particle geometry not formed from milling including cryogenic milling; having increased operating window characteristics for selective laser sintering, multi jet fusion, or high speed sintering three-dimensional printing applications; a precipitated pulverulent polymer which includes a melting temperature that is higher than its recrystallization temperature, and melting characteristics suitable for effective localized melting; being sinterable from about room temperature to less than about 150 degrees Celsius; and being produced through chemical precipitation and having a particle size range from about 25 microns to about 75 microns.

Another illustrative embodiment of the present disclosure may comprise a precipitated pulverulent polymer formed by one or more of the following: a first precipitation process comprising: mixing one or more of the polymers into a solution of toluene and eicosapentaenoic acid forming a composition; adding a stabilizer to the composition; stirring the composition; heating the composition to boil; boiling off the eicosapentaenoic acid from the composition; and drying the precipitated polymer powder; a second precipitation process comprising: dissolving one or more of the polymers in ethanol forming a composition; heating the composition; and precipitating the polymer into a crystalline powder; a third precipitation process comprising: melting one or more of the polymers in nitrogen in an autoclave and heating contents in the autoclave to a temperature above 200 degrees Celsius; increasing the pressure in the autoclave; maintaining the pressure in the autoclave while heating the contents to over 250 degrees Celcius; depressurizing the autoclave while holding-in the nitrogen; and drying any resulting polymer powder; a fourth precipitation process comprising: adding one or more of the polymers to a container with ethanol denatured with 2-butanone and about 1% water forming a composition; heating the composition to above 130 degrees Celsius for about an hour; cooling the composition; and removing the ethanol through distillation; a fifth precipitation process comprising: mixing one or more polymers with laurolactam, 1,12-dodecanedioic acid, water, and aqueous hypophosphorous acid to form a composition; heating the composition in an autoclave; maintaining autogenic pressure from the composition in the autoclave; stirring the composition in the autoclave; depressurizing the autoclave to atmospheric pressure; and passing nitrogen over the composition; and a sixth precipitation process comprising: adding one or more polymers to a tank; heating the polymer to above 140 degrees Celsius; stirring the polymer in the tank; adding ethanol denatured with 2-butanone and water to the tank forming a composition; holding the composition at the elevated temperature for a period of time; reducing the heat; removing the ethanol by distillation while stirring the composition; and drying the composition.

Another illustrative embodiment of the present disclosure provides one or more polymer materials suitable for three-dimensional printing, comprising at least one or more of the following characteristics: the one or more polymer being one or more polyether block amide, thermoplastic polyurethane, and/or thermoplastic olefin; the one or more polymer being any polyether block amide made from polycondensation of a carboxylic acid polyamide and an alcohol termination polyether; the one or more polymer being any thermoplastic or thermoplastic polyurethane that includes a linear segmented block of polymers; the one or more polymer being any blend of polyether block amide, thermoplastic polyurethane, and/or thermoplastic olefin; the one or more polymer formed through chemical precipitation; the one or more polymer being a precipitated pulverulent polymer; the one or more polymer particle geometry formed from chemical precipitation; the one or more polymer particle geometry not formed from milling including cryogenic milling; the one or more polymer being a precipitated pulverulent polymer possessing increased operating window characteristics useful in selective laser sintering, multi jet fusion, high speed sintering, and possibly electrophotography three dimensional printing applications; the precipitated pulverulent polymer possessing increased operating window characteristics that includes at least one of: a wider than typical range between and among the melting and recrystallization temperatures, a larger enthalpy upon melting, and low volumetric change during recrystallization for a given polymer; the precipitated pulverulent polymer includes a melting temperature that is higher than its recrystallization temperature, and melting characteristics suitable for effective localized melting; the precipitated pulverulent polymer includes characteristics that allow for an operating window that keeps a portion of the material unmelted, near the presence of a laser or near the selectively deposited fusing agent when heated via IR heater used during 3D-printing, in solid form so the unmelted solid material acts as a supporting structure for any molten polymer; the precipitated pulverulent polymer includes particles that soften at low temperatures but do not fuse together until exposed directly to the heat source, such as the laser or IR heater; the precipitated pulverulent polymer may be sinterable from about room temperature to less than about 150 degrees Celsius; the precipitated pulverulent polymer does not suffer thermal degradation during the printing process; the precipitated pulverulent polymer produced through chemical precipitation has a more stable and print-suitable particle size and geometry, spherical geometry, less need for flow agent, particle size control, and tight distribution of particle geometries; the precipitated pulverulent polymer produced through chemical precipitation has an optimum particle-size and geometry range to balance between cohesion and object detail; the precipitated pulverulent polymer produced through chemical precipitation has a particle size range from about 25 microns to about 75 microns; the precipitated pulverulent polymer during three-dimensional printing cools concurrently when an object is finished printing; the precipitated pulverulent polymer having a particle-size distribution determined by laser scattering; the precipitated pulverulent polymer having a melting point and enthalpy determined through Differential Scanning calorimetry; the precipitated pulverulent polymer having a powder flow measured using Method A of VIN EN ISO 6186; and the precipitated pulverulent polymer having a modulus of elasticity and tensile strength determined pursuant a DIN/EN/ISO 527 standard.

BRIEF DESCRIPTION OF THE DRAWINGS

The exemplary apparatuses, systems, and methods shall be described hereinafter with reference to the attached drawing which is given as a non-limiting example only, in which.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "upon", "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The present disclosure relates to pulverulent precipitated polyether block amides (PEBA), thermoplastic polyurethanes (TPU), and thermoplastic olefins (TPO), that possess increased operating window characteristics useful in, for example, SLS, MJF, HSS, and possibly electrophotography 3D-printing applications. For purposes of this disclosure, an "increased operating window" includes the characteristics of at least one of a wider than typical range between and among the melting and recrystallization temperatures, a larger enthalpy upon melting, and lower volumetric change during recrystallization for a given TPE.

Illustrative polymers that are within the scope of this disclosure include, but are not limited to, varieties PEBAs, TPOs, and TPU's. Such PEBA's contemplated to be within the scope of the disclosure include, by way of non-limiting example, PEBAX (Arkema) polyether block amide, Vestamid E (Evonik) polyether block amide, Santoprene (ExxonMobil) block copolymer, Termoton (Termopol Polimer) block copolymer, Arnitel (DSM) block copolymer, Solprene (Dynasol) block copolymer, Engage (Dow) block copolymer, Dryflex (Elasto) block copolymer, Mediprene (Elasto) block copolymer, and Kraton (Kraton Polymers). Of course, it will be appreciated by the skilled artisan, in light of the discussion herein, that other PEBAs suitable to gain an increased operating window for 3D-printing using the methodologies referenced below, is contemplated to be within the scope of this disclosure. PEBAs made from polycondensation of a carboxylic acid polyamide and an alcohol termination polyether, are similarly contemplated to be within the scope of this disclosure as well. Similarly, thermoplastic olefins that include a fraction of thermoplastic, elastomer, and filler, may be contemplated within the scope of this disclosure.

Thermoplastic polyurethanes of the type contemplated in this disclosure illustratively include Texin (Bayer) thermoplastic polyurethane, Elastollan (BASF) thermoplastic polyurethane, Doesmopan (Covestro) thermoplastic polyurethane, Estane (Lubrizol) thermoplastic polyurethane, Irogran (Huntsman) thermoplastic polyurethane, Avalon (Huntsman) thermoplastic polyurethane, Isothane (Greco) thermoplastic polyurethane, Zythane (Alliance) thermoplastic polyurethane, Tekron (Teknor) thermoplastic elastomer, and Elexar (Teknor) thermoplastic elastomer. It will also be appreciated, based on the disclosure herein, that any thermoplastic and particularly thermoplastic polyurethane that includes a linear segmented block of polymers may be within the scope of the embodiments.

It is further contemplated that blends of one or more of the above polymers may be included within the scope of this disclosure. Further, it will be understood to the skilled artisan, in light of this discussion of the embodiments herein, that flow agents and fillers may be incorporated into, and/or into the disclosed methodologies to produce, the disclosed precipitated pulverulent polymers.

As referenced, embodiments of the present disclosure provide precipitated pulverulent ones of the afore-discussed thermoplastic elastomers (including polyether block amides) and thermoplastic polyurethanes that possess increased operating window characteristics, such as for enhanced use in SLS, MJF, HSS, and possibly electrophotography 3D-printing applications. Physical characteristics of suitable precipitated pulverulent polymers each include a melting temperature that is higher than its recrystallization temperature, and melting characteristics suitable for effective localized melting. These characteristics allow for an operating window that keeps the rest of the material unmelted, such as even in the presence of a laser or IR heater used during 3D-printing in solid form. The unmelted solid material can then act as a supporting structure for the molten polymer.

For purposes of this disclosure, an increased operating window includes the characteristics of at least one of a wider range between the melting and recrystallization temperatures, a larger enthalpy upon melting, and low volumetric change during recrystallization. By modifying the polymer's characteristics, its particles may soften at lower temperatures but do not fuse together until exposed directly to the heat source, such as the laser. It is appreciated that these polymers may be sinterable from about room temperature to less than 150 degrees Celsius. With these glass transition temperatures (Tg) and sinter temperatures ranges it is less likely the polymers will suffer thermal degradation during the printing process, among other advantages.

Powder-based 3D-printing includes a part bed and feed bed. This part bed is generally at a steady temperature before it is subjected to an energy source. That energy source is raised until a fusion temperature is reached. Material is placed on a feed bed at a start temperature. During operation additional material is placed on top of the original material which cools and needs to be raised again. If the polymer does not have large enough crystallite or enough mass in the crystallites to be able to absorb excess energy to stay crystalline, and if there is too much heat it starts melting the feed bed material causing unexpected molten polymer called growth. It is preferred to only melt the portion of polymer that is directly subjected to energy and not the surrounding polymer. With larger crystallites and higher melting temperature, more energy to melt those crystallites is needed which means there is less growth from the feed bed material. It is believed precipitating the polymer will create larger crystallites to limit this growth.

A common prior method of modifying these polymers to achieve some of the foregoing advantages is through milling, such as cryogenic milling. In contrast to milling, however, chemical precipitation better enhances the polymers' operating windows and additional printing characteristics. A chemically precipitated polymer also provides a more stable and print-suitable particle size and geometry. For SLS, HSS, and MJF 3D-printing applications, there tends to be an optimum particle-size and geometry range to balance between cohesion and object detail. If the polymer's particle size is too small it becomes too powdery and has a tendency to clump during printing. In contrast, if the polymer's particle size is too large, fine features and details on the printed object become lost.

Optimum particle size ranges provided by the disclosed embodiments may range from about 25 microns to about 75 microns. Deviating downward about 8 microns to about 10 microns from this range increases the risk of clumping issues, depending on the desired printing environment. On the other hand, if the particle size is deviated upwards a significant amount from the foregoing range, the polymer's ability to produce fine detail on an object may no longer be possible. Hence, the chemical precipitation aspects disclosed produce average particle sizes within the optimum 25 microns through 75 microns range. Typical particle sizes may range over a much more significant variation, such as from 5 microns to 500 microns.

Milled polymers in the known art also produce particles with geometries that may decrement 3D print performance, such as particles having jagged and fractured edges. This is, in part, because the milling does not provide a rounding-type grinding action, but rather provides more of a shear grinding. By contrast, the disclosed chemical precipitation techniques for polymers provide particles with much more spherical geometry. This translates into particle size and physical characteristic stability, less need for flow agents or additives, and better particle size control in polymer blends. The disclosed precipitated polymers also have a tight distribution of particle geometries, which may be beneficial for their physical characteristics in SLS and MJF 3D-printing applications.

Figure 1:
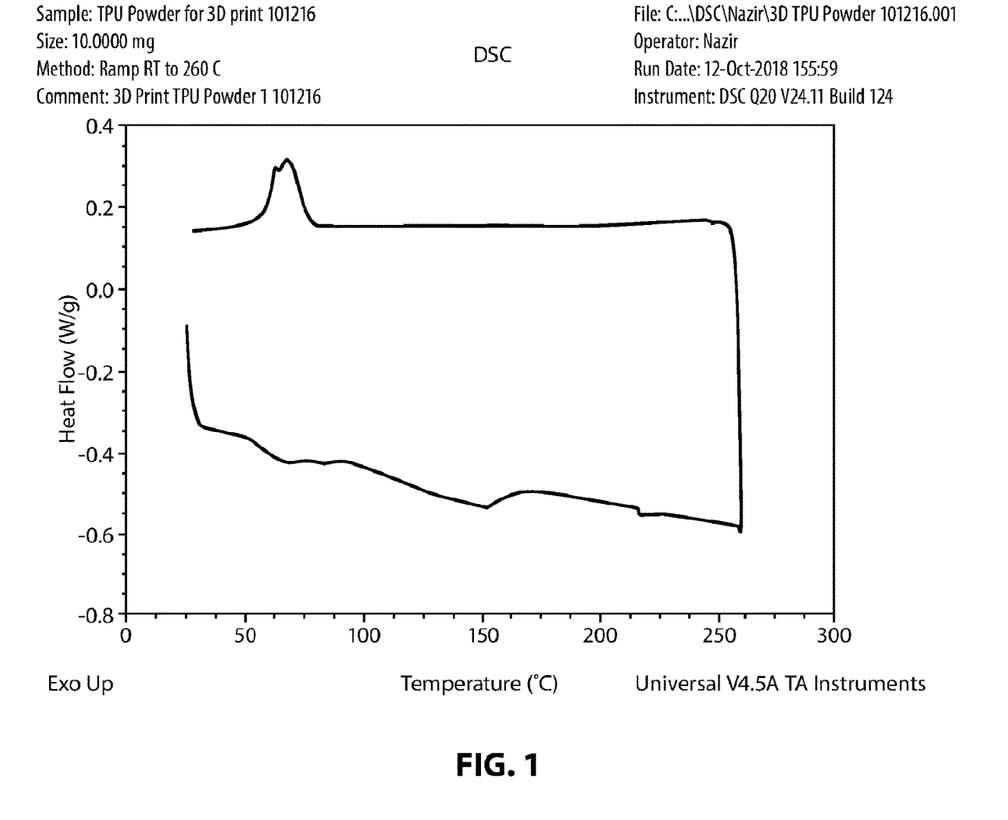
FIG. 1 is a differential scanning calorimetry diagram of a non-use TPU powder designed for 3D-printing.

A differential scanning calorimetry (DSC) diagram showing the phase transitions of an exemplary non-use TPU specifically designed for 3D-printing is shown in FIG. 1. This prior art TPU been corrected for non-heat flow which accounts for its flat curve. It shows several different melting peaks that and several different crystallites available ranging from about 60 degrees C. up to about 150 and about 210. It has a recrystallization temperature starting at about 90 degrees C.

Figure 2:
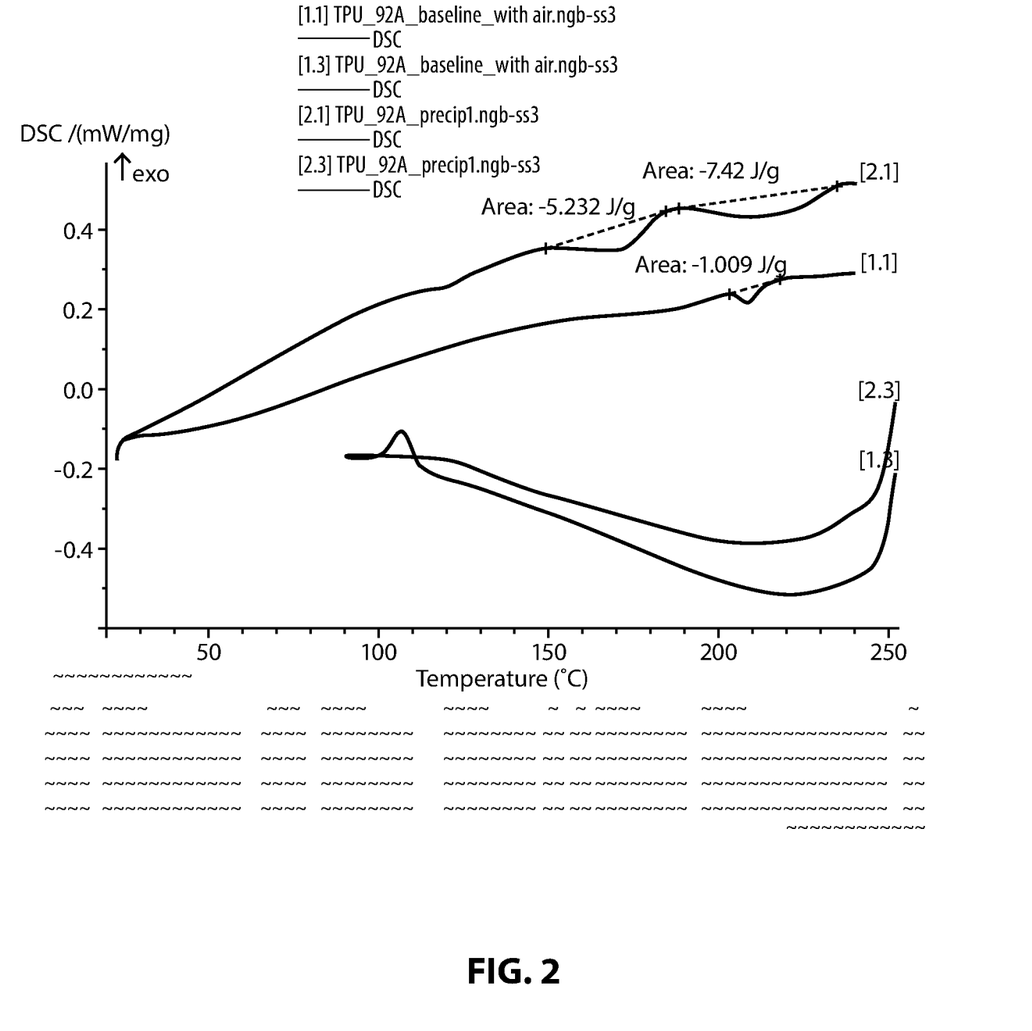
FIG. 2 is a differential scanning calorimetry diagram of an exemplary precipitated TPU and baseline TPU.

Precipitation methods may also create pulverulent polymers that have the melting temperatures and enthalpy needed to obtain proper powder melting characteristics during SLS, HSS, and MJF 3D-printing. FIG. 2 shows DSC diagrams of a baseline TPU and an exemplary precipitated TPU. The baseline TPU, identified in the graph as 1.1 and 1.3, is an off-the-shelf TPU not specifically designed for 3D-printing. The precipitated TPU was also not designed specifically for 3D-printing and is identified as 2.1 and 2.3 in the graph. During melting the precipitated TPU 2.1 demonstrates larger crystallites than the base polymer 1.1. It appears the baseline has about 1 joule per gram of melting enthalpy where the precipitated TPU developed two different types of crystallites present of about 5 and about 7 joules per gram, respectively. With regard to recrystallization temperature, the baseline TPU 1.3 appears to have a recrystallization temperature of about 105 degrees Celcius. Recrystallization of precipitated polymer had not been observed yet at about 90 degrees Celcius. It unexpectedly appeared that the recrystallization temperature shifted. Also, because there is no sharp peak on the 2.3 line like there is on the 1.3 line it appears that the recrystallization may have slowed.

A variety of methods to chemically precipitate the above-identified polymers may be employed. One skilled in the art will appreciate, based on illustrative methods described below, that other precipitation methods may be employed in the embodiments though they are not explicitly disclosed herein.

Figure 3:
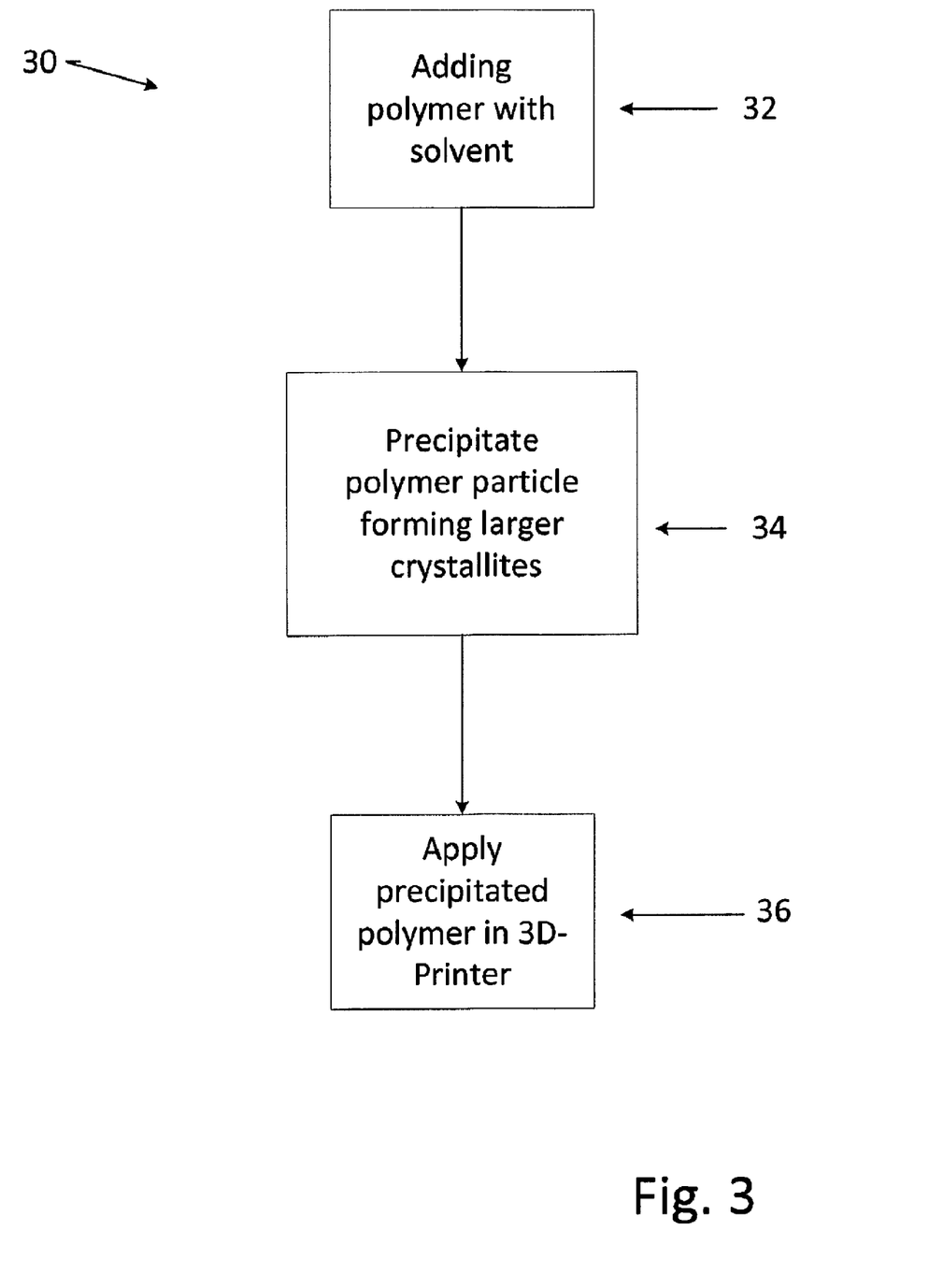
FIG. 3 is a flow chart depicting an illustrative process according to the present disclosure.

As will be further appreciated to the skilled artisan, in light of the discussion and the embodiments herein, an illustrative embodiment may provide adding a polymer to a solvent and precipitating it to allow the polymer to form larger, thicker crystallites which produce the foregoing operating window for power-based 3D-printing. FIG. 3 is a flow chart that illustratively depicts such an embodiment of the disclosure. This process includes placing a polymer in a solvent at reference numeral 32 known for use with that solvent. At reference numeral 34 the polymer is precipitated to form larger crystallites which are believed to provide desired characteristics of higher melting temperature and broader operating window based on the desired precipitation size. It is further believed solvent-based precipitation of the polymer produces a more ordered crystalline structure because the polymer chains have more mobility to conform and form the crystallites during this process. The precipitated polymer is then used in powder-based 3D-printing (i.e., SLS, HSS, and MJF printing) as depicted at reference numeral 36.

Accordingly, characteristics of pulverulent precipitated polymers do not produce a large volumetric change until the entire object is built during SLS, HSS, and MJF 3D-printing. When 3D-printing an object, it is detrimental to experience crystallinity in the plastic before the object is completed. The entire object should be in an isotherm, or about the same temperature, so it does not undergo crystallization. Otherwise, a moment of irregularity in the crystallization may be produced while printing, which may lead to a catastrophic stress or strain. Likewise, if one part of the object crystallizes before another part, the irregular moments may cause the object to distort.

Figure 4:
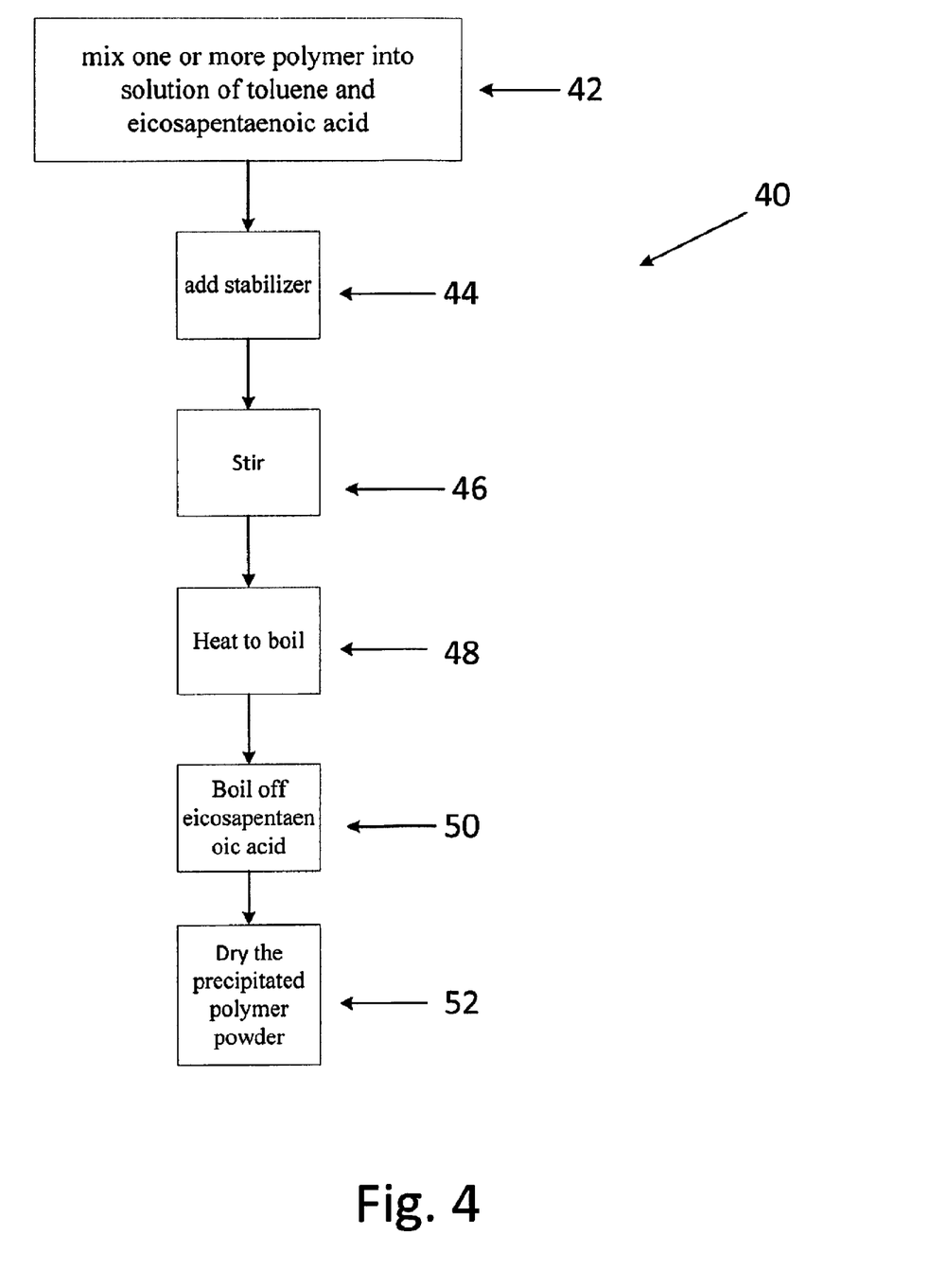
FIG. 4 is a flow chart depicting an illustrative process of making a precipitated pulverulent polymer.

An illustrative method of making the precipitated pulverulent polymer includes a mixture of the polymer, toluene, eicosapentaenoic acid (EPA), and water. An illustrative flow chart depicting this exemplary process 40 is shown in FIG. 4. The process includes first mixing any of the foregoing polymers into a solution of toluene and EPA as shown at 42. Water is added and the composition is heated as depicted at 44 and stirred at 46. A stabilizer may be added to stabilize the toluene at 44. The composition continues to heat until it boils as indicated at 48. Continued boiling causes the EPA to boil off at 50, leaving the precipitated polymer powder which is then dried at 52. It is noted that this process is believed to form controlled-size powders.

Particle-size distribution may be determined by laser scattering. Melting point and enthalpy may be determined through DSC. Powder flow may be measured using Method A of VIN EN ISO 6186. Modulus of elasticity and tensile strength maybe determined pursuant the DIN/EN/ISO 527 standard.

It is appreciated that the polymers may be mixed in different ratios and particle sizes. This may have the effect of changing or controlling the properties of the resulting pulverulent powdered polymer.

It is further contemplated that the above-identified polymers may be developed in powdered form through other methods of chemical precipitation. Other such examples include dissolving the polymer, or polymers in ethanol and precipitating the polymer(s) into a crystalline powder.

An alternate method of chemical precipitation of one or more of the above-identified polymers may include melting the one or more of the polymers in nitrogen at a temperature above 200 degrees Celsius. The composition is placed in an autoclave where the internal pressure is increased. Pressure is maintained while heating to over 250 degrees Celcius. The autoclave is depressurized while holding-in the nitrogen. The resulting material is then dried.

Another method of chemically precipitating the polymers may include adding one or more of the above-identified polymers in a container with ethanol denatured with 2-butanone and about 1% water. The composition is then heated to above 130 degrees Celsius for about an hour. The composition is then cooled and ethanol removed through distillation. The precipitated polymers form during cooling.

In another embodiment, laurolactam, is mixed with 1,12-dodecanedioic acid, water, and aqueous hypophosphorous acid. The composition is heated and maintains autogenic pressure in an autoclave where it is also stirred. The heat and pressure is held for a first period of time. The composition is depressurized to atmospheric pressure and nitrogen passed over for a second period of time to form the polymer.

In another embodiment, the polymer or polymers may be heated above 140 degrees Celsius and stirred in a tank. Ethanol denatured with 2-butanone and water are added to the tank. The composition is held at the elevated temperature for a period of time and stirred. The heat is then reduced and the ethanol removed via distillation while the composition is still being stirred. Once precipitation starts, the distillation rate is increased until the internal temperature of the composition lowers. The composition is then dried with any remaining ethanol removed through further distillation.

It is appreciated that these polymers may also be re-precipitated according to one or more of these above methods. It is further appreciated that different temperatures, pressures, times, and stir rates may be applied to these precipitation methods to modify the various characteristics of the polymers.

In conjunction with the use of the above-identified polymers, a further illustrative embodiment includes adding a flow agent to the pulverulent powdered polymer. Illustratively the flow agent may include one or more: fumed silicas, calcium silicates, alumina, amorphous alumina, magnesium silicates, glassy silicas, hydrated silicas, kaolin, attapulgite, glassy phosphates, glassy borates, glassy oxides, titania, talc, pigments, or mica. The particle size of these flow agents may be about 10 microns or less. Additionally, they are included only to the extent they enhance the flow of the polymer material. In an illustrative embodiment, the flow agent may be blended with the pulverulent precipitated polymer(s). It is appreciated that the amount of flow agent used should not significantly alter the Tg of the polymer(s). Illustratively, the flow agent will be present in an amount less than 5% by weight of the composition.

Because the polymer powders of the present disclosure are precipitated rather than milled, they have particles with much more spherical geometry. This means there is less need for flow agents or additives. And if a flow agent is added, much less than what may otherwise be required for milled powders. With precipitated polymers, the flow agent just needs to assist the powdered polymer to level when poured into a container. It is also appreciated that the flow agent is introduced to only dry powder polymer, and only blended to the extent there is a sufficient distribution of the agent. Static electricity may build up in the powder if over-mixed which may limit the powder's ability to level when poured into a container.

Another illustrative embodiment of the present disclosure may include adding compatible fillers to the powdered polymers. These fillers may be organic or inorganic. Such fillers may include pigments, glass, ceramic, or metal, in particulate, or bead form. In this illustrative embodiment fillers should have particle sizes equal to or less than the average particle size of the corresponding powdered polymer. Additionally, the fillers may occupy up to about 25% by weight of the entire powder blend.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A polymer material suitable for three-dimensional printing, comprising a precipitated thermoplastic polyurethane, formed by a precipitation process comprising:
   mixing a base thermoplastic polyurethane with laurolactam, 1,12-dodecanedioic acid, water, and aqueous hypophosphorous acid to form a composition;
   heating the composition in an autoclave;
   maintaining autogenic pressure from the composition in the autoclave;
   stirring the composition in the autoclave;
   depressurizing the autoclave to atmospheric pressure; and
   passing nitrogen over the composition to complete the precipitation, wherein the precipitated thermoplastic polyurethane has a larger enthalpy upon melting compared to a baseline thermoplastic polyurethane.

2. A precipitation process for forming a polymer material suitable for three-dimensional printing comprising a precipitated thermoplastic polyurethane comprising:
   mixing a base thermoplastic polyurethane with laurolactam, 1,12-dodecanedioic acid, water, and aqueous hypophosphorous acid to form a composition;
   heating the composition in an autoclave;
   maintaining autogenic pressure from the composition in the autoclave;
   stirring the composition in the autoclave;
   depressurizing the autoclave to atmospheric pressure; and
   passing nitrogen over the composition to complete the precipitation, wherein the precipitated thermoplastic polyurethane has a larger enthalpy upon melting compared to a baseline thermoplastic polyurethane.

3. The precipitation process of claim 2, further comprising precipitating in a distinct solvent and allowing the polymer to form crystallites.

4. The precipitation process of claim 2, wherein the precipitated polymer produced has a particle size range from about 25 microns to about 75 microns.

* * * * *